United States Patent
Codega

(10) Patent No.: US 8,763,216 B2
(45) Date of Patent: Jul. 1, 2014

(54) SNAP HOOK DEVICES

(75) Inventor: Antonio Codega, Città (IT)

(73) Assignee: CAMP S.p.A., Premana (LC) (IT)

( * ) Notice: Subject to any disclaimer, the term of this patent is extended or adjusted under 35 U.S.C. 154(b) by 63 days.

(21) Appl. No.: 13/530,137

(22) Filed: Jun. 22, 2012

(65) Prior Publication Data

US 2012/0324684 A1    Dec. 27, 2012

(30) Foreign Application Priority Data

Jun. 23, 2011 (IT) ............... MI2011A1145
Jun. 23, 2011 (IT) ............... MI2011A1148

(51) Int. Cl.
*F16B 45/02*     (2006.01)

(52) U.S. Cl.
USPC ........ 24/599.5; 24/599.4; 24/599.9; 24/600.1

(58) Field of Classification Search
CPC ............ F16B 45/02; F16B 45/25; B66C 1/36
USPC ........ 24/599.4, 599.5, 599.9, 600.1; 294/82.2
See application file for complete search history.

(56) References Cited

U.S. PATENT DOCUMENTS

| | | | | |
|---|---|---|---|---|
| 4,621,851 A | * | 11/1986 | Bailey, Jr. ............... | 294/82.2 |
| 5,664,304 A | * | 9/1997 | Tambornino .............. | 24/599.1 |
| 5,735,025 A | * | 4/1998 | Bailey ..................... | 24/600.1 |
| 6,283,524 B1 | * | 9/2001 | Simond .................... | 294/82.2 |
| 6,450,558 B1 | * | 9/2002 | Ringrose .................. | 294/82.2 |
| 6,718,601 B1 | * | 4/2004 | Choate ..................... | 24/600.2 |
| 6,832,417 B1 | * | 12/2004 | Choate ..................... | 24/600.1 |
| 7,636,990 B1 | * | 12/2009 | Choate ..................... | 24/600.1 |
| 2005/0229367 A1 | | 10/2005 | Thompson | |
| 2009/0056088 A1 | * | 3/2009 | Petzl et al. ................ | 24/599.9 |

FOREIGN PATENT DOCUMENTS

EP       1344951 A1    9/2003
EP       2333359 A1    6/2011

* cited by examiner

*Primary Examiner* — Robert J Sandy
*Assistant Examiner* — David Upchurch
(74) *Attorney, Agent, or Firm* — Robert E. Alderson, Jr.

(57) ABSTRACT

Snap hooks, particularly snap hooks with a screw lock for mountaineering and climbing are provided. Such snap hooks may include a ring which has a straight side, interrupted by an opening defined by first and second ends, in which the opening is closed by a spring closing element which has an open position and a closed position, the snap hook having a separation lever dividing the space enclosed by the ring in two separate areas wherein the lever is independent from the closing element, and wherein the closing element and the separating lever are hinged to the same hinge.

16 Claims, 4 Drawing Sheets

SNAP HOOK DEVICES

CROSS REFERENCE TO RELATED APPLICATION

This application claims priority to and benefit of Italian Patent Application No. MI2011A001148 filed Jun. 23, 2011 and of Italian Application No. MI2011A001145 filed Jun. 23, 2011, both of which are incorporated by reference in their entirety.

FIELD OF THE INVENTION

The present invention relates to a snap hooks, particularly snap hooks having screw locks for mountaineering and climbing.

BACKGROUND OF THE INVENTION

Slings are basic accessories for modern climbing. They are used to secure climbers in case of falls and to secure climbing companions.

Slings typically include a structure formed by technical fabric bands that surround the climbers' hips and thighs which secures him or her and provides coupling points for necessary gear.

Slings are connected to securing or descent devices by means of a snap hook, typically, a snap hook with a screw lock, in order to avoid its accidental release. Such snap hooks normally have sufficiently large dimensions, on the one hand, to allow it to be secured to a sling ring, and on the other hand, to allow the insertion of a belay or abseil device. Thus, the latter are free to slide along the inner ring of the snap hook, forcing the user into uncomfortable, unpractical and/or dangerous positions of the snap hook, due to transversal loads acting on the snap hook itself.

To overcome this drawback, snap hooks having a movable lever dividing the insertion space of the ring of the belay or abseil device from that of the sling ring, have been proposed. However, these solutions have significant drawbacks. First, the space accommodating the sling ring is too small. This is because the movable lever operates below the hinging point of the spring closing element of the snap hook, thus in the area adjacent to the smaller curve of the snap hook.

Another significant drawback is that the movable lever can be easily opened if the sling ring is accidentally pushed towards the larger curve of the snap hook, thus hindering the separation function between the two areas that the movable lever should perform.

Thus, the problem addressed by the present invention is the need for snap hooks solving the above mentioned drawbacks.

SUMMARY OF THE INVENTION

Such problem is solved by snap hooks described herein.

Thus, one object of the present invention is to provide snap hooks equipped with a separation between the ring insertion area of a belay or abseil device and the ring insertion area of a sling which allows easy engagement and disengagement of a belay or abseil device.

A further object is to provide snap hooks that decrease the probability of accidental opening of the separation lever between the two areas.

Yet a further object of the invention is to provide snap hooks equipped with a separation between the ring insertion area of a belay or abseil device and the ring insertion area of a sling that is easier to use than state-of-the-art snap hooks.

Further non-limiting characteristics and advantages of the present invention will become more evident from the following description and with reference to the following figures, in which:

DETAILED DESCRIPTION

Figure 1:
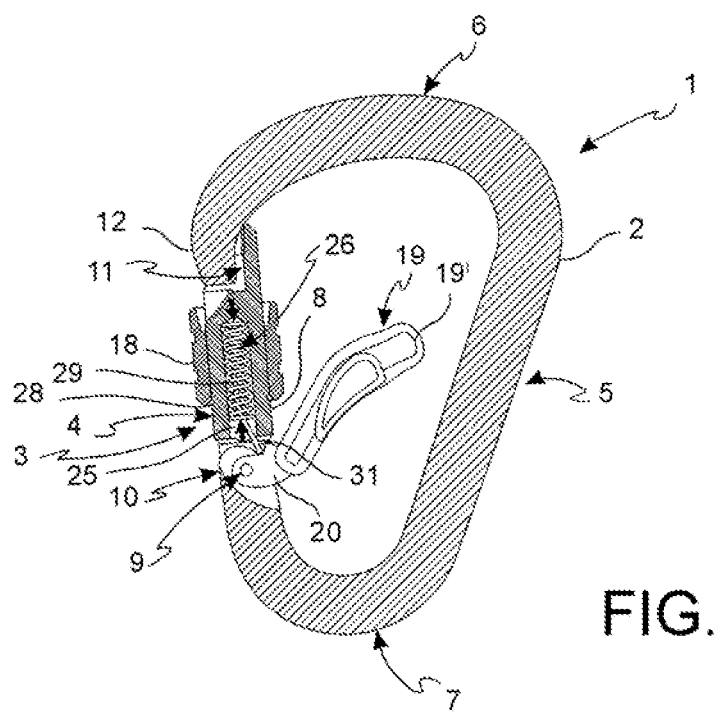
FIG. 1 represents a sectional plan view of a representative snap hook according to the present invention.

With reference to the figures, snap hooks according to representative embodiments of the invention, are indicated as a whole with reference no. 1. Such snap hooks may include a ring 2 having a first straight side 3 interrupted by an opening defined by first and second ends 10, 12. The opening may be closed by a spring closing element 4 that may have an open position, to allow the insertion in the snap hook 1 of a rope or a ring of a different device, and a closed position, in which the closing element 4 closes the snap hook ring 2, preventing said rope or ring of the different device from exiting.

In a certain embodiment, the ring 2 may have first and second straight sides 3, 5, converging and connected by first and second curves 6, 7, in which the first curve 6 has a curving radius larger than the second curve 7.

The closing element 4 may include a tubular body 8, in which the length is larger than the first straight side opening 3. The tubular body 8 may be hinged by means of a hinge 9 at the first end 10 of the first straight side 3 and may have, at the second opposite end 12, a longitudinal blind groove 11 having such shape and size to allow for the insertion of the second end 12 of the straight side 3 and its abutment stop inside said groove 11.

Figure 2:
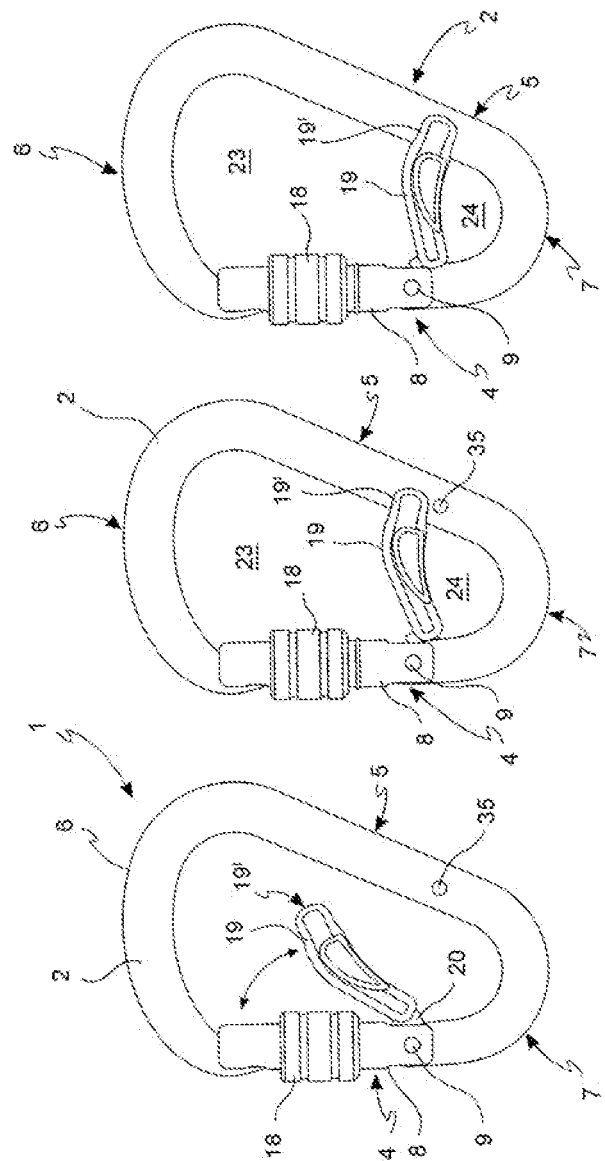
FIGS. 2A, 2B and 2C represent plan views of the snap hook of FIG. 1, according to an operating sequence.

The external surface of the tubular body 8 may include a thread 17. A screw lock 18 may include an inner hole diameter substantially corresponding to, or slightly larger than the external diameter of the tubular body 8, and may include an inner thread (not shown) meant to cooperate with the thread 17 of the tubular body 8. In this way, the screw lock 18 may slide on the tubular body 8 until it is completely screwed on the thread 17 and consequent locking of the tubular body 8 in a closing position, when the groove 11 is filled with the end 12 of the straight side 3 (FIG. 2B or 2C).

Between the hinge 9 and the thread 17, an annular notch 27 may be arranged, in which a stop ring 28 is inserted, which functions to prevent the screw lock 18 from sliding against the hinge 9.

At the hinge 9, the tubular body 8 may have a longitudinal through-groove 13, through which may be drilled a transverse bore 14. The groove 13 is configured to be placed bridging the end 10 of the straight side 3 of the snap hook, that in turn may have a transverse through-bore 15 and a slot 22 on the symmetry plan of the snap hook ring 2.

A lever 19 may be hinged on the same hinge 9, articulating the tubular body 8 and protruding inside the space enclosed by the snap hook ring 2.

At one end, the lever 19 may have a tab 20 which has a through-bore 21, whereas the opposite end may include a portion 19' for engaging with the snap hook ring 2.

The tab 20 of the lever 19 is configured so that it may be inserted into slot 22 of end 10, in order to align the respective through-bores 15, 21.

A pin 16 may be inserted through said bores 14, 15, 21 of the tubular body 8, end 10 and tab 20, respectively, when they are aligned, thus implementing the hinge 9.

The lever 19 represents separation means between a first area 23, close to the first curve 6, and a second area 24, close to the second curve 7 of the internal space of ring 2.

As mentioned above, the closing element 4 of the snap hook and the separation means, e.g. the lever 19, may be hinged on the same hinge 9. The lever 19 may have first and second separating positions (FIGS. 2B and 2C, respectively), and one open position (FIG. 2A).

The tubular body 8 may accommodate in its inner part a blind cavity 25, where elastic means are housed 26.

Elastic means 26 may include a helical spring 29 and a leaf spring 30 or similar arrangements.

The helical spring 29 may engage at an end with the bottom of the blind cavity 25, whereas the opposite end may be free.

The leaf spring 30 may include a curved blade 31 having a flexion point 31c, an abutment end 31a, and a holding end 31b, and which includes, outside the flexion point 31c, a step 32. When the elastic means 26 are assembled, the abutment end 31a may press on tab 20 of lever 19 (as shown in FIG. 1), whereas step 32 may engage with the free end of the helical spring 29. On the other hand, the holding end 31b of the blade 31 may enter through the turns of the helical spring 29 and keep the blade 31 in position.

Figure 4:
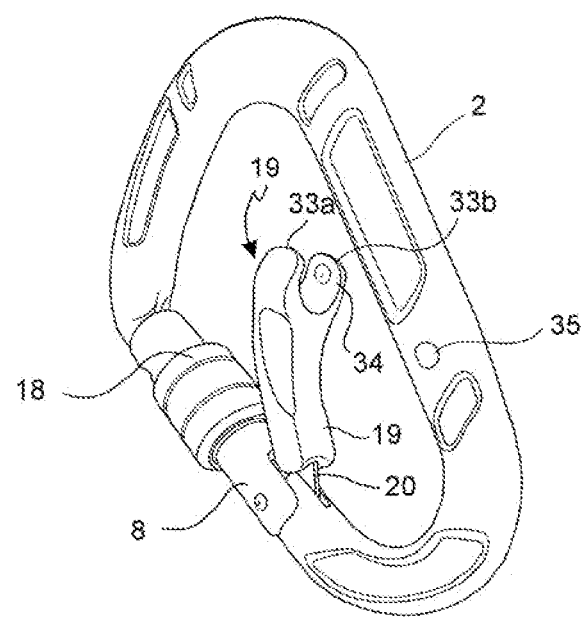
FIG. 4 represents a perspective view of a particular embodiment of the invention.

In certain embodiments, such as that shown in FIG. 4, the engaging portion 19' of lever 19 with ring 2 may have a fork shape, in order to bridge on ring 2, particularly at the closed straight side 5.

For this purpose, portion 19' may include two opposite arms 33a, 33b, each of them having a relief 34 on the side facing the other arm. In certain embodiments, the relief 34 has rounded profiles, for example, a domed profile.

Figure 3:
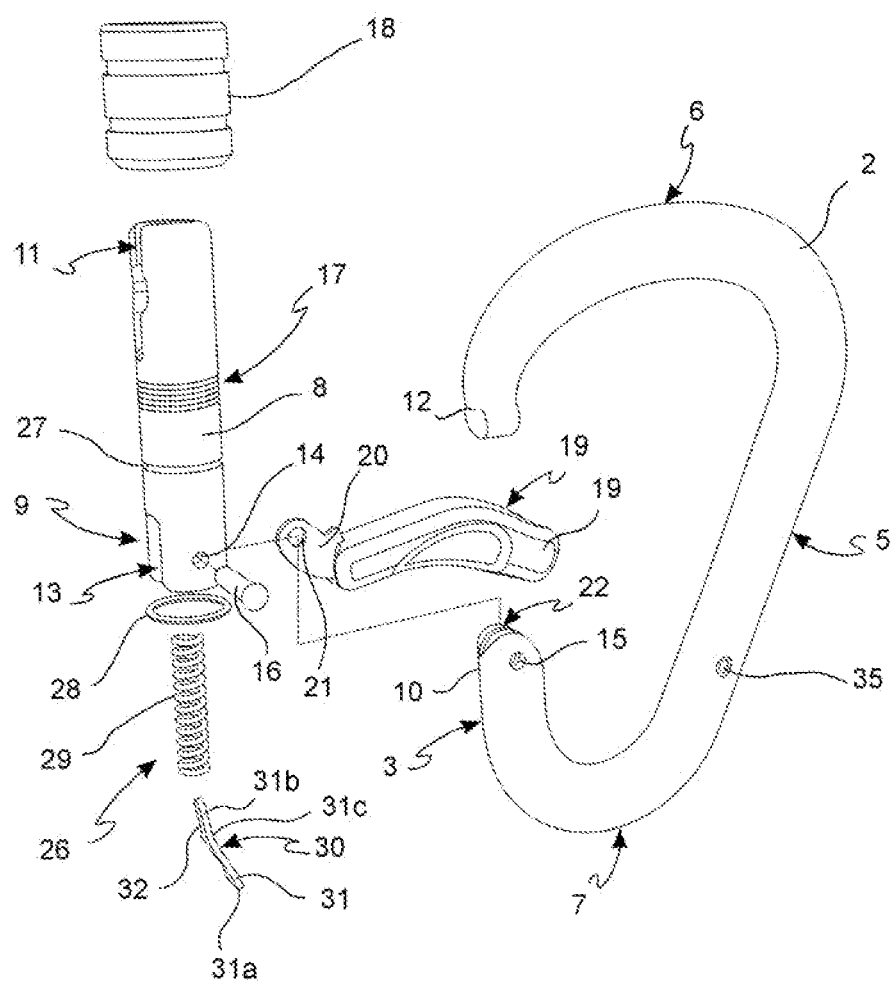
FIG. 3 represents an exploded perspective view of the snap hook according to the invention.

On the straight side 5 of the ring 2, aligned along a transversal axis, two recesses 35 may be provided (FIGS. 3 and 4 show just one of them, since the other one would be located on the hidden face) that are meant to engage, in a shape coupling, with reliefs 34 of arms 33a, 33b of lever 19.

The operation of snap hooks according to the invention is described below.

The opening and closing of closing element 4 may be performed, as usual, making it swing in the direction shown by the arrow in FIG. 2A. When the closing element 4 is open, it is thus possible to engage the snap hook with the sling and insert a different device, such as a belay or an abseil device.

The returning action which closes element 4 is due to the flexion of the blade 31 that, as already stated, may be provided, for example, by a leaf spring 30.

Now, the screw lock 18 may be screwed on the thread 17 of tubular body 8, locking element 4 and preventing its accidental opening (see, for example, the position of screw lock 18 in FIGS. 2B and 2C).

The sling ring may be inserted in area 24 by raising lever 19 to allow access to said area (position of lever 19 in FIG. 2A). Such raising movement of lever 19 may be made in contrast with elastic means 26 that tend to return lever 19 to its closing position. In use, raising lever 19 causes a consequent raising of blade 31, so that step 32 of blade 31 presses against the free end of helical spring 29, which compresses and elastically returns toward its initial position, corresponding to the closing of lever 19.

As previously stated, lever 19 may have a first separation position (FIG. 2B), in which it simply abuts against ring 2, and a second separation position (FIG. 2C), in which relief 34 of arms 33a, 33b of lever 19 engage, snapping the corresponding recesses 35 provided on ring 2. This second separation position may be accomplished by slight finger pressure of the user, since rounded profiles of reliefs 34 represent a snapping curtail step. The same consideration applies to the unlocking and opening of lever 19.

It should be noted that such a snapping engagement is normally sufficient, during operation, to prevent accidental opening of lever 19, so that an efficient and effective separation of the two areas 23, 24 of the inner space of ring 2 is achieved.

It also should be noted that, in both separation positions (FIGS. 2B and 2C), lever 2 may bridges on ring 2, making the separation position of lever 19 safer.

Advantages of the present invention are readily apparent. First the use of a single hinge 9 for closing element 4 of the snap hook and for lever 19 to divide the inner space of ring 2 represents an important simplification from the implementation point of view, making the manufacturing process quicker and more cost-effective.

In addition, the present invention allows for placement of the hinging point of lever 19 as high as possible, thus increasing the useful space in area 24, compared to snap hooks in which the lever is hinged below the spring closing element of the hinge.

Another advantage is that, although they use the same hinge, closing element 4 and lever 19 are independent elements and thus can be opened independently one from the other.

In addition, the positioning of lever 19 bridging ring 2 increases its stability and its resistance in the separation position, both when it simply abuts, and when a snapping engagement is realized with recesses 35 of ring 2.

The invention claimed is:

1. A snap hook comprising a ring having a straight side, interrupted by an opening defined by first and second ends,
   wherein said opening is closed by a spring closing element having an open position and a closed position, said snap hook comprising a separation lever, dividing a space enclosed by the ring in two separate areas,
   wherein said lever is independent from said closing element and
   wherein said closing element and said separation lever are hinged to a same hinge,
   wherein the closing element comprises a tubular body, whose length is larger than the first straight side opening, the tubular body being hinged with the same hinge at the first end of the first straight side,
   wherein at said same hinge, the tubular body has a longitudinal through-groove, transversally drilled by a bore, said groove bridging the first end of the straight side of the ring;
   wherein said first end has a transverse through-bore and a slot on the symmetry plan of the snap hook ring; and
   wherein the lever includes at one end a tab having a through-bore, a pin being inserted through said bores of the tubular body, of the first end of the straight side and of the tab, respectively, when they are aligned, to implement the same hinge.

2. The snap hook of claim 1, wherein the ring comprises first and second straight sides, converging and connected by first and second curves, wherein the first curve has a curving radius larger than the second curve.

3. The snap hook of claim 1, wherein at the second end the tubular body comprises a longitudinal blind groove having such shape and size to allow the insertion of the second end of the straight side and its abutment stop inside said groove.

4. The snap hook of claim 3, wherein the external surface of the tubular body comprises threads which allow screwing of the internal thread of a screw lock to lock the tubular body in a closed position, when the groove is filled with the end of the straight side of the ring.

5. The snap hook of claim 1, wherein the tubular body accommodates in its inner part a blind cavity where elastic means are housed for elastically returning the closing element to a closed position of the ring, and for elastically returning the tab to a separation position of the space enclosed by the ring in two separate areas.

6. The snap hook of claim 5, wherein the elastic means comprise a helical spring and a leaf spring.

7. The snap hook of claim 6,
wherein at one end the helical spring engages with the bottom of the blind cavity, and
wherein the opposite end is free;
wherein the leaf spring comprises of a curved blade having a flexion point, an abutment end and a holding end, and comprises outside the flexion point a step,
wherein, when the elastic means are assembled, the abutment end presses on the tab of the lever, and
wherein the step engages with the free end of the helical spring and the holding end of the blade enters through the turns of the helical spring to keep the blade in position.

8. The snap hook of claim 1, wherein the lever comprises, at the opposite end with respect to the tab, a portion engaging with the ring, said portion being shaped as a fork.

9. The snap hook of claim 8, wherein said portion of the lever comprises two opposite arms, having a relief on the side facing the other arm, said reliefs being adapted to engage, in a shape coupling, with respective recesses provided aligned along a transverse axis on the ring, in order to provide a snapping engagement.

10. The snap hook of claim 9, wherein the reliefs have rounded profiles.

11. The snap hook of claim 1, wherein the lever includes a first separation position, wherein said portion abuts against the ring, and a second separation position, wherein the reliefs of the arms of the lever engage by snapping the corresponding recesses provided on the ring.

12. The snap hook of claim 3, wherein an annular notch is arranged between the same hinge and the thread of the tubular body, wherein a stop ring is inserted, adapted to prevent the screw lock from sliding against the same hinge.

13. A snap hook comprising a ring having a straight side, interrupted by an opening defined by first and second ends,
wherein said opening is closed by a spring closing element having an open and a closed position, said snap hook comprising a separation lever, dividing a space enclosed by the ring in two separate areas, said lever being hinged at one end of the ring,
wherein the lever includes at one end a tab having a through-bore, a pin being inserted through said bores of the tubular body, of the first end of the straight side and of the tab, respectively, when they are aligned, to implement the hinge,
wherein said lever comprises, at the opposite end of the hinging end, a portion engaging the ring, said portion being fork-shaped, in order to bridge on the ring, and
wherein the portion of the lever comprises two opposite arms, each having a relief on the side facing the other arm, said reliefs being adapted to engage, in a shape coupling, with respective recesses aligned along a transverse axis on the ring, in order to provide a snapping engagement.

14. The snap hook of claim 13, wherein the ring has first and second straight sides, converging and connected by first and second curves, and wherein the first curve has a curving radius larger than the second curve.

15. The snap hook of claim 13, wherein the reliefs have rounded profiles.

16. The snap hook of claim 13, wherein the tab includes a first separation position, wherein the portion abuts against the ring, and a second separation position, wherein the reliefs of the arms of the lever engage by snapping the corresponding recesses provided on the ring.

* * * * *

UNITED STATES PATENT AND TRADEMARK OFFICE
CERTIFICATE OF CORRECTION

PATENT NO.       : 8,763,216 B2  
APPLICATION NO.  : 13/530137  
DATED            : July 1, 2014  
INVENTOR(S)      : Antonio Codega Page 1 of 1

It is certified that error appears in the above-identified patent and that said Letters Patent is hereby corrected as shown below:

On the title page item 75  
Inventor now reads:    Antonio Codega, Citta (IT)  
Inventor should read:  Antonio Codega, Premana (LC), (IT)

Signed and Sealed this  
Ninth Day of June, 2015

Michelle K. Lee  
*Director of the United States Patent and Trademark Office*